United States Patent [19]

Otsuka

[11] Patent Number: 5,307,425
[45] Date of Patent: Apr. 26, 1994

[54] BI-LEVEL HALFTONE PROCESSING CIRCUIT AND IMAGE PROCESSING APPARATUS USING THE SAME

[75] Inventor: Itsuro Otsuka, Kyoto, Japan

[73] Assignee: Rohm Co., Ltd., Kyoto, Japan

[21] Appl. No.: 938,609

[22] Filed: Sep. 1, 1992

[30] Foreign Application Priority Data

| Sep. 2, 1991 | [JP] | Japan | 3-248287 |
| Sep. 2, 1991 | [JP] | Japan | 3-248288 |
| Sep. 2, 1991 | [JP] | Japan | 3-248289 |
| Sep. 2, 1991 | [JP] | Japan | 3-248290 |

[51] Int. Cl.$^5$ .................. G06K 9/38; H04N 1/04; H04N 1/40
[52] U.S. Cl. .................. 382/50; 382/52; 382/53; 358/465; 358/466
[58] Field of Search .................. 382/50-54; 358/465, 466; G06K 9/38, 9/40; H04N 1/04, 1/40

[56] References Cited

U.S. PATENT DOCUMENTS

| 4,692,811 | 9/1987 | Tsuchiya et al. | 382/54 |
| 5,121,446 | 6/1992 | Yamada et al. | 382/52 |

Primary Examiner—Jose L. Couso
Attorney, Agent, or Firm—Fay, Sharpe, Beall, Fagan, Minnich & McKee

[57] ABSTRACT

An upper limit value and a lower limit value are used to modify the correction value computed in a correction value computing circuit in such a way that the correction value ranges between the upper and lower limit values. The threshold value computed from the upper and lower limit values is compared with the modified value to compute a binary value. The upper and lower limit values are selected to become those which the correction value may take. The correction value is obtainable in conformity with the density value resulting from converting the density value of an object pixel of an original image in terms of an exponential function or the approximate function of it.

11 Claims, 5 Drawing Sheets

BI-LEVEL HALFTONE PROCESSING CIRCUIT AND IMAGE PROCESSING APPARATUS USING THE SAME

BACKGROUND OF THE INVENTION

TECHNICAL FIELD

The present invention relates generally to bi-level halftone processing circuits and image processing apparatus such as facsimiles (hereinafter referred to as "FAX") and copying machines using the same. More particularly, the present invention relates to bi-level halftone processing circuits for use in image data processing circuits including FAX and copying machines in such a way as to output variable halftone image display data spuriously as binary data by substituting spatially distributed binary values "0", "1" for the variable density of input images, and to FAX, copying machines and the like using the circuit stated above.

BACKGROUND ART

Figure 5:
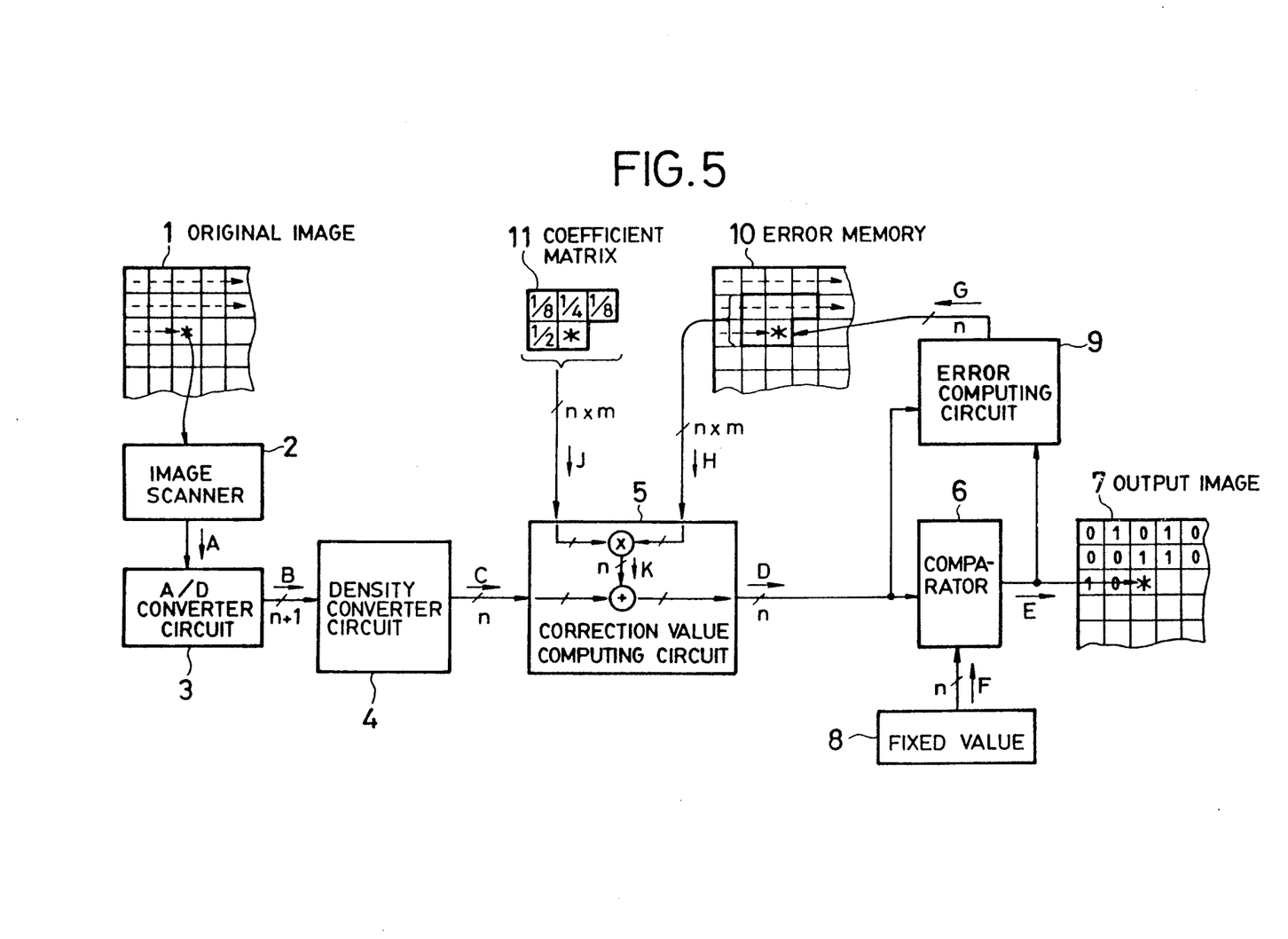
FIG. 5 is a block diagram of a conventional bi-level halftone processing circuit.

FIG. 5 is a block diagram of a conventional bi-level halftone processing circuit. This circuit comprises an image scanner 2, an A/D converter circuit 3, a density converter circuit 4, a correction value computing circuit 5, a comparator 6, an error computing circuit 9, an error memory 10, and a coefficient matrix 11. In this case, the image scanner 2 represents a specific example of an image input apparatus for generating a signal A (hereinafter referred to as "density signal A") for indicating object pixel density in an analog value by reading the variable density of the object pixel (*) of an original image 1.

On receiving the density signal A of the pixel of the original image 1, the A/D converter circuit 3 converts the signal into a (n+1) bit digital value and generates a signal B (hereinafter referred to as "density data B") for indicating the density in a digital value. In this case, the value of D is normally about 6. As the A/D conversion requires high-speed processing, a circuit of a parallel comparison type is often used for the A/D converter circuit 3. Incidentally, a description will temporarily be given of the density data B with one side where a density data value increases as a black level side.

The density converter circuit 4 is a circuit for making so-called $\tau$ correction and the density data B is converted into data coordinate with visual sensitivity having logarithmic functional characteristics that the human visual sensation possesses. In other words, this circuit subjects the density data B to logarithmic conversion and generates a digital value C (hereinafter referred to as "density data C") indicating the density conforming to the human visual sensitivity. As the conversion at this time is non-linear, the quantity of information is reduced by half and the density data C is generated as what has n bits, that is, one bit less than those contained in the density data B.

The error memory 10 is a memory which stores a binary error with respect to the pixel of the original image 1 that has already been converted into a binary value. The correction value computing circuit 5 selects a local error matrix H comprising m binary errors around a storage cell (*) corresponding to the object pixel (*) to be converted into a binary value from the error memory 10. Further, the correction value computing circuit 5 computes a quantity of correction K from the product (the sum of elements of the matrix obtained by multiplication) of a coefficient matrix J comprising predetermined weighting coefficients and the selected local error matrix H and corrects the density data C using the quantity of correction K. Consequently, this circuit computes and outputs a correction value D indicating the digital density value thus corrected. The computation of the correction value D is a process of converting the density of the pixel of the original image into a relative value which tends to disperse in the space around the pixel.

The comparator 6 receives a fixed value 8 as its threshold value F and compares the correction value D with the threshold value F so as to generate a binary value E; for instance, "111 ... 1" when the correction value D is greater than the threshold value F and "000 ... 0" when both are equal or when the former is smaller than the latter. "1" or "0" of "111 ... 1" or "000 ... 0" of binary value E is output via a printer and the like as the value of the pixel (*) corresponding to an output image 7; for instance, as data "1" and "0" to be displayed in black and white, respectively.

The error computing circuit 9 computes the difference (in level) between the binary value E and the correction value D as a binary difference, and outputs and writes the value thus computed to a position (storage cell (*)) in the storage cell corresponding to an output pixel position in the error memory 10. As a result, this error is utilize as one of the error data for use in generating a correction value with respect to the pixel density thenceforth.

In the bi-level halftone processing circuit thus arranged, the density value of an object pixel (*) to be converted into a binary value presently is corrected by using the binary error already computed before being converted into a binary value. A binary error G is computed from the correction value D and the binary value E and used for the conversion-to-binary process. In other words, the variable density information on the original image 1 is spatially propagated and diffused via the binary error in this correction process. Since correction is based on the binary error like this, the output image 7 holds the variable density information on the original image 1 in such a form that the information has been distributed spatially though it is still a binary image and provides a bi-level halftone visually corresponding to the halftone of the original image.

Since the binary image holding the aforementioned variable density information is output, an image data processing circuit using the bi-level halftone processing circuit can be made smaller in scale in a case where data is processed than in a preceding case where multiple data is processed. Moreover, such a circuit as this is fit for cost reduction, the miniaturization of the apparatus and so forth. Therefore, bi-level halftone processing circuits have been applied to FAX, copying machines and the like. In particular, the bi-level halftone processing circuit is suitable for use in an image data processing circuit for FAX in view of the quantity of communicative information.

However, the quantity of information is reduced by half because of the $\tau$ correction made by the density converter circuit 4 in the conventional bi-level halftone processing circuit. This is due to mismatching resulting from the fact that in comparison to the accuracy of the data processed in the A/D converter circuit, the accuracy of the data processed in the binary circuit later is degraded. Moreover, this is equivalent to one-bit decrement as stated above and is also equivalent to one-bit increment when the A/D converter circuit is viewed from any other circuit even though one bit is simply decremented. In other words, this A/D converter circuit does not correspond to the number of bits to be processed by any other digital circuit and is consequently unsuitable for integration in contrast to other circuits. If the A/D converter circuit is introduced into an integrated circuit, it will account for an unnecessarily large percent of the whole integrated circuit and this is also undesirable as high-speed operation is required. As a result, an analog processing circuit giving a low production yield has replaced the A/D converter circuit in a case where the latter is to be incorporated in an integrated circuit. The same problem also arises among FAX and copying machines having the bi-level halftone processing circuit thus arranged.

SUMMARY OF THE INVENTION

An object of the present invention is to provide a bi-level halftone processing circuit capable of coordinating the number of bits to be processed by a peripheral circuit and that of conversion bits in an A/D converter circuit and also fit for integration.

Another object of the present invention is to provide a bi-level halftone processing circuit capably of reducing the number of bits by one in an A/D converter circuit and also fit for integration.

Still another object of the present invention is to provide a bi-level halftone processing circuit wherein a density converter circuit can be dispensed with.

A further object of the present invention is to provide an image processing apparatus for a high-performance, small-sized FAX and a similar copying machine by putting a bi-level halftone processing circuit fit for integration to practical use.

The bi-level halftone processing circuit according to the present invention features that a correction value computed in a correction value computing circuit is modified so that the correction value ranging from an upper limit value to a lower limit value in order to convert the correction value thus obtained into a binary value by comparing the correction value thus obtained with a threshold value computed from the upper and lower limit values, the aforementioned upper and lower limit values being selected to be those which may be taken by the aforementioned correction value obtainable in proportion to the density value converted in terms of the exponential function with respect to the density value of the object pixel of an original image. As a result, the binary value thus obtained becomes equivalent to what has been subjected to $\tau$ correction. Moreover, data in a binary error memory is also given as a difference of the upper or lower limit value and its value comes up to what has involved the exponential function. In this way, the binary difference that has already been computed can be used to correct the density value of the object pixel of the original image intended for binary conversion without the $\tau$ correction, that is, without reducing the quantity of information. Therefore, a density converter circuit can be dispensed with.

The bi-level halftone processing circuit according to the present invention is not provided with the density converter circuit in the bi-level halftone processing circuit shown in FIG. 5 but provided with a correction marginal value generating circuit, a threshold generating circuit and a correction value modifying circuit instead. Moreover, an error computing circuit receives the correction value modified by the correction value modifying circuit. The modification of the correction value in the correction value modifying circuit should be arranged so that the correction value is not allowed to exceed the range of the upper limit value to the lower limit value.

The correction marginal value generating circuit provided according to the present invention receives density data from A/D converter circuit and generates the upper and lower limit values by converting the density data into an exponential function or the approximate function of it on condition that the black level adopts a maximum value. These upper and lower limit values determine the upper and lower limit values or a range of allowable values that the correction value may take in relation to the peripheral density, the correction value itself being such that it may be computed from the correction value computing circuit on the basis of the density data that has been subjected to $\tau$ correction. In other words, these upper and lower limit values obtain a correction value obtainable from the correction value computing circuit 5 in accordance with the contents of the error memory 10 with respect to center density data in the circuit of FIG. 5 having the density converter circuit 4 for making the $\tau$ correction, and correspond the upper and lower limit values that may be taken in relation to the then density data when the correction value changes the surrounding density data. These upper and lower limit values correspond the limit value of the characteristic respectively when a correction value concerning a certain density is subjected to the $\tau$ correction.

In other words, the logarithmic functional characteristic curve of the $\tau$ correction is approximated to an exponential functional, or its approximate functional characteristic curve according to the present invention. The approximate value is set to range between the upper and lower limit values and the correction value thus computed is restricted to the range of the upper-to-lower limit values. Although a black level normally takes the maximum value in the exponential functional curve, the exponent of the exponential function corresponding to the exponential functional characteristic curve picks a value of 1 or less when a white level is set to the maximum value a in the $\tau$ correction characteristic.

The threshold generating circuit receives the upper and lower limit values, generates a dynamic threshold value by subjecting them to linear computation and supplies a threshold value resulting therefrom to a comparator.

The correction value modifying circuit receives the correction value, the upper and lower limit values and modifies the correction value in such a ways as to make it range from the upper limit value to the lower limit value. In brief, what exceeds the upper limit value is set back to the upper limit value and what falls short of the lower limit value is set at the lower limit value. The value thus modified is supplied to the comparator. Incidentally, the value ranging from the upper limit value to the lower limit value is not modified but directly output as a modified value. The comparator compares the modified value with the aforementioned threshold value and outputs what is obtained therefrom.

The error computing circuit computes the difference between the modified value and the upper limit value and the difference between the modified value and the lower limit value, and supplies one of the results to the error memory as a binary error, depending on the binary value resulting from the comparison.

With this arrangement, the density converter circuit for making the τ correction becomes unnecessary and this prevents the omission of one-bit information with respect to the information of the A/D conversion as in a case where the density converter circuit is employed. Conversely, an A/D converter circuit with the omission of one bit may be used when it is desired to hold performance equal to that of the conventional bi-level halftone processing circuit using the density converter circuit, whereby the A/D converter circuit is allowed to deal with the number of bits to be processed by any other digital circuit. As a result, it becomes possible to provide a low-priced, high-performance bi-level halftone processing circuit contributing to the miniaturization of an apparatus at a high yield rate. Moreover, this circuit can be subjected to one-chip integration and image processing apparatus such as high-performance, small-sized FAX, copying machines and thereby the like can be put to practical use.

Data is obtainable as the difference between the modified value and the upper or lower limit value from the error memory 10 according to the present invention. An effect equal to that of the τ correction is thereby given to the binary error value intended to propagate and diffuse spatially the variable density information on the original image. Consequently, a certain quantity of τ correction is necessarily added to the correction value even though the correction value computing circuit receives density data that has been subjected to no τ correction.

DESCRIPTION OF THE PREFERRED EMBODIMENTS

Figure 1:
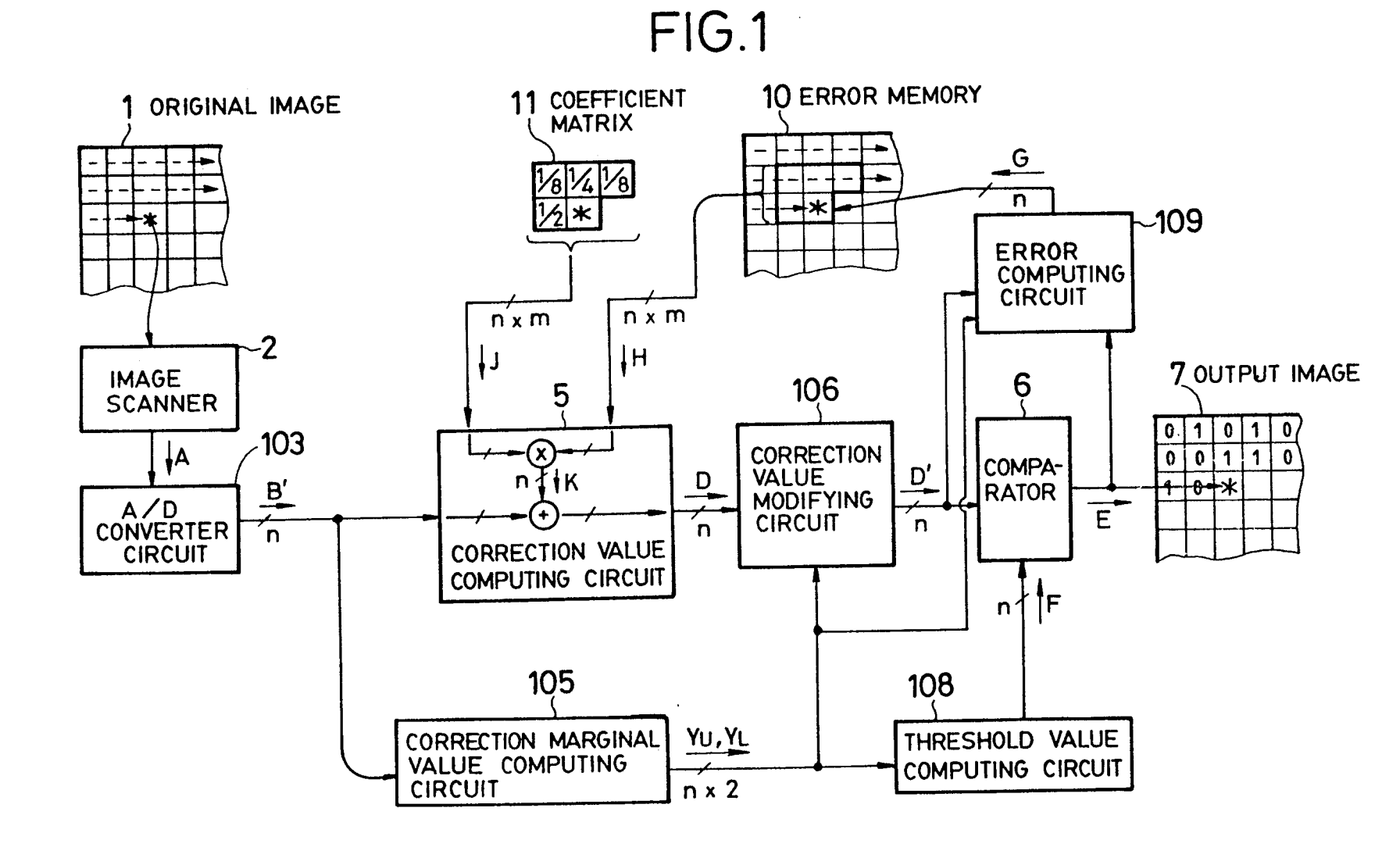
FIG. 1 is a block diagram of a bi-level halftone processing circuit embodying the present invention.

In FIG. 1, like reference characters designate like component parts of FIG. 5 and the description of them will be omitted. The density converter circuit 4 of FIG. 5 has been deleted in this embodiment and the A/D converter circuit 3 has also been replaced with an A/D converter circuit whose accuracy is degraded by one bit to what is shown in FIG. 5. Therefore, the A/D converter circuit 103 converts a density signal A into n-bit density data B' on condition that the black level adopts a maximum value. In place of density data C, the density data B' in value is supplied to a correction value computing circuit 5 and a correction value D is computed in accordance with binary error data in an error memory 10.

A correction marginal value computing circuit 105 represents a specific example of that sort and is actually formed of mainly a 2n×n-bit memory for data conversion (ROM or PROM, EPROM, EEPROM, register). A value deriving from the density data B' on an object pixel (*) of an original image 1 is used as an address value for gaining access to the memory and causes an upper limit value YU and a lower limit value YL to be output. As this circuit includes the memory, it is fit for integration and makes it easy to adjust the functional condition infinitesimally on the basis of test results retroactively.

As mentioned above, the upper and lower limit values computed by the correction marginal value computing circuit 105 are subjected by the memory to data conversion to become the upper limit value YU and the lower limit value YL on receiving the density data B' from the A/D converter circuit. The values resulting from the data conversion are obtained as the upper and lower limit values under the best and worst conditions of the peripheral density data with the respect to the correction value obtained by logically computing the correction value obtained from the correction value computing circuit 5 on the basis of the density data B' subjected to τ correction in accordance with the value of the density data B'. Then the upper limit value YU and the lower limit value YL are output from the correction marginal value computing circuit 105 as the upper and lower limit values. Briefly speaking, they may also be obtained logically if a specific exponential function and a correction method in the correction value computing circuit 5 are determined. Moreover, they may be obtained by actually correcting density data B' on a number of images to obtain experimental values.

A threshold value computing circuit 108 is a specific example of a threshold value generating circuit which on receiving the upper and lower limit value YU, YL, computes a threshold value F accordingly. More specifically, the threshold value computing circuit 108 is mainly formed with an adder and makes a linear computation such as (upper limit value + lower limit value)÷2 and so on. A constant for modification in addition to the result of computation may be added further.

A correction value modifying circuit 106 comprises mainly a comparator and a selector. This circuit modifies the correction value D to the upper and lower limit values YU, YL when it does not exceed the upper and lower limit values.

In this way, the upper limit value or the lower limit value is compulsorily restored by the correction value modifying circuit 106 when the value computed by the correction marginal value computing circuit 105 exceeds the upper limit value or the lower limit value and these upper and lower limit values vary in conformity with the density data B' correspondingly according to the present invention. As a result, the halftone may not be fully expressed as before, depending on the upper and lower limit values thus taken. Therefore, the threshold value is caused to change dynamically in accordance with the upper and lower limit values. The simplest way of setting the threshold value is to take an intermediate value of the upper and lower limit values in view of the binary principle and as this is a simple way of solving the above problem, ½ of (upper limit value + lower limit value) is set in the threshold value computing circuit 108.

An error computing circuit 109 comprises mainly a subtracter (or adder) and a selector. This circuit is formed by adding the selector to the error computing circuit 9 of FIG. 5. This circuit computes the difference between a modified value D' and the upper limit value YU and the difference between the modified value D' and the lower limit value YL, selects proper one of the differences by means of the selector in conformity with the result of comparison made in the comparator 6, and supplies the proper one to the error memory 10.

The threshold value F' computed by the threshold value computing circuit 108 is not a fixed value as before but the intermediate value between the upper and lower limit values (not necessarily an intermediate value) in this embodiment as set forth above. Consequently, the comparator regards a segment above the intermediate value as an upper limit side and outputs "1" as "111 , , , 1" of the maximum binary value E (black level), whereas it regards a segment below the intermediate value as an lower limit side and outputs "0" as "000 . . . 0" of the minimum binary value E (white level). The intermediate value may belong to the upper or lower limit side. As a result, the error on the upper limit side is considered right when the binary value E is "111 . . . 1" and the error on the lower limit side is considered right when the binary value E is "000 . . . 0". Therefore, the selector of the error computing circuit 109 selects the difference between the upper limit value and the modified value D' when the binary value E is "111 . . . 1" and the difference between the lower limit value and the modified value D' in the other case.

The value thus stored in the error memory 10 is referred to by the correction value computing circuit 5 and the density value of the pixel obtained subsequently is corrected. Then information on variable density is spatially propagated and diffused, so that a correction value accompanying the $\tau$ correction is generated.

As will be understood from the description above, the present invention is not implemented for obtaining a correction value by subjecting the density data B' to the $\tau$ correction and performing the correction value computing process on the result of that correction as before. According to the present invention, the upper and lower limit values of a correction value that may be obtained by subjecting the density data B' to the $\tau$ correction are predetermined and the correction value is compulsorily determined at the upper limit value or the lower limit value only when the value resulting from performing the correction value computing process on the basis of the density data B' free from the $\tau$ correction exceeds the upper limit value or the lower limit value. The condition of the $\tau$ correction is thus maintained and while the correction value stays within the range, it is directly output as a modified value, whereby the correction value is caused to have the $\tau$ correction effect. Therefore, the same result is obtained from the output image as if it were subjected to the $\tau$ correction even with the omission of the density converter circuit.

Figure 2:
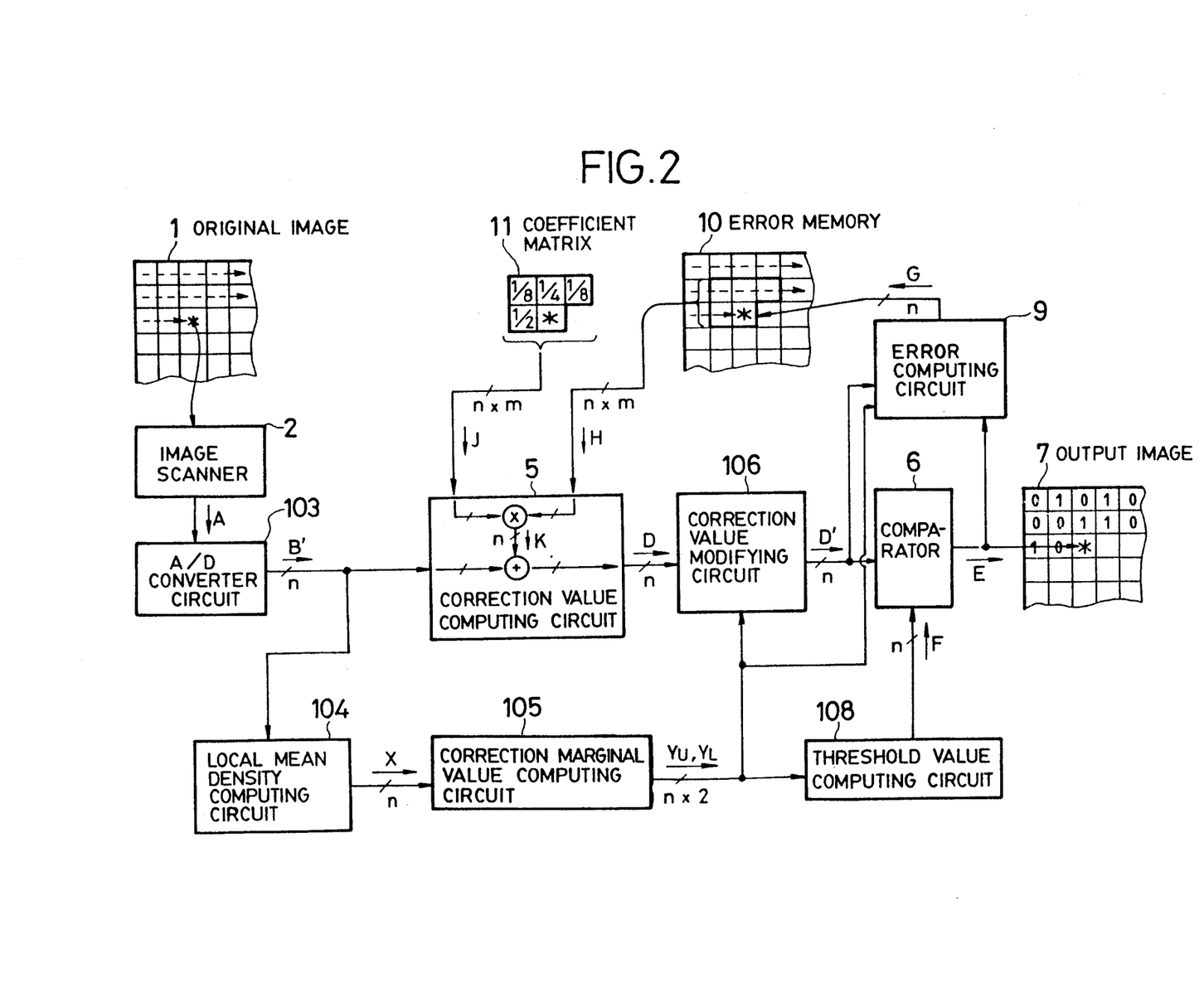
FIG. 2 is a block diagram of another bi-level halftone processing circuit embodying the present invention.

A bi-level halftone processing circuit in another embodiment of the present invention of FIG. 2 is designed to compute upper and lower limit values in conformity with a mean density by not directly obtaining the upper and lower limit values from the density data B' but obtaining the mean density in a predetermined area from the density data B'

For this purpose, a local mean density computing circuit 104 is provided before the correction marginal value computing circuit 105. The density data B' is supplied to the local mean density computing circuit 104 in order to compute a local mean density with a digital value and the value thus computed is supplied to the correction marginal value computing circuit 105 to obtain the upper and lower limit values. These values are then supplied to the correction value modifying circuit 106, the threshold computing circuit 108 and the error computing circuit 109. The local mean density is produced by averaging density data already obtained on the peripheral pixels with respect to the pixel whose density data has been obtained. A range of peripheral area may properly be determined.

More specifically, the local mean density computing circuit 104 comprises RAM for storing data on the density of several lines and an adder (divider). On receiving the density data B' of an object pixel (*), this circuit stores the data in the RAM, reads density data on the peripheral pixels of the object pixel (*), and computes a local mean density value X from the value thus read. It is often the case with the computation of the local mean density value X to use a subtracter and a register so as to reduce the number of adders and the number of additions or to omit the divider by setting the number of pixels to the second power of 2.

On receiving the local mean density value, the correction marginal value computing circuit 105 converts the local mean density value in terms of an exponential function and computes upper and lower limit values. These values are computed likewise as in the embodiment of FIG. 1.

When the bi-level halftone process is applied to the original image, an undesirable striped pattern will appear in an output image as the binary process proceeds. This is called a texture and a texture suppressor circuit is usually provided between the density converter circuit 5 and the correction value computing circuit 5 of FIG. 5 to suppress the texture. This circuit adds an addition quantity R successively taken out of an addition pattern of a matrix type normally 8×8 in size to density data C and the density data corrected thereby is supplied to the correction value computing circuit 5.

Figure 3:
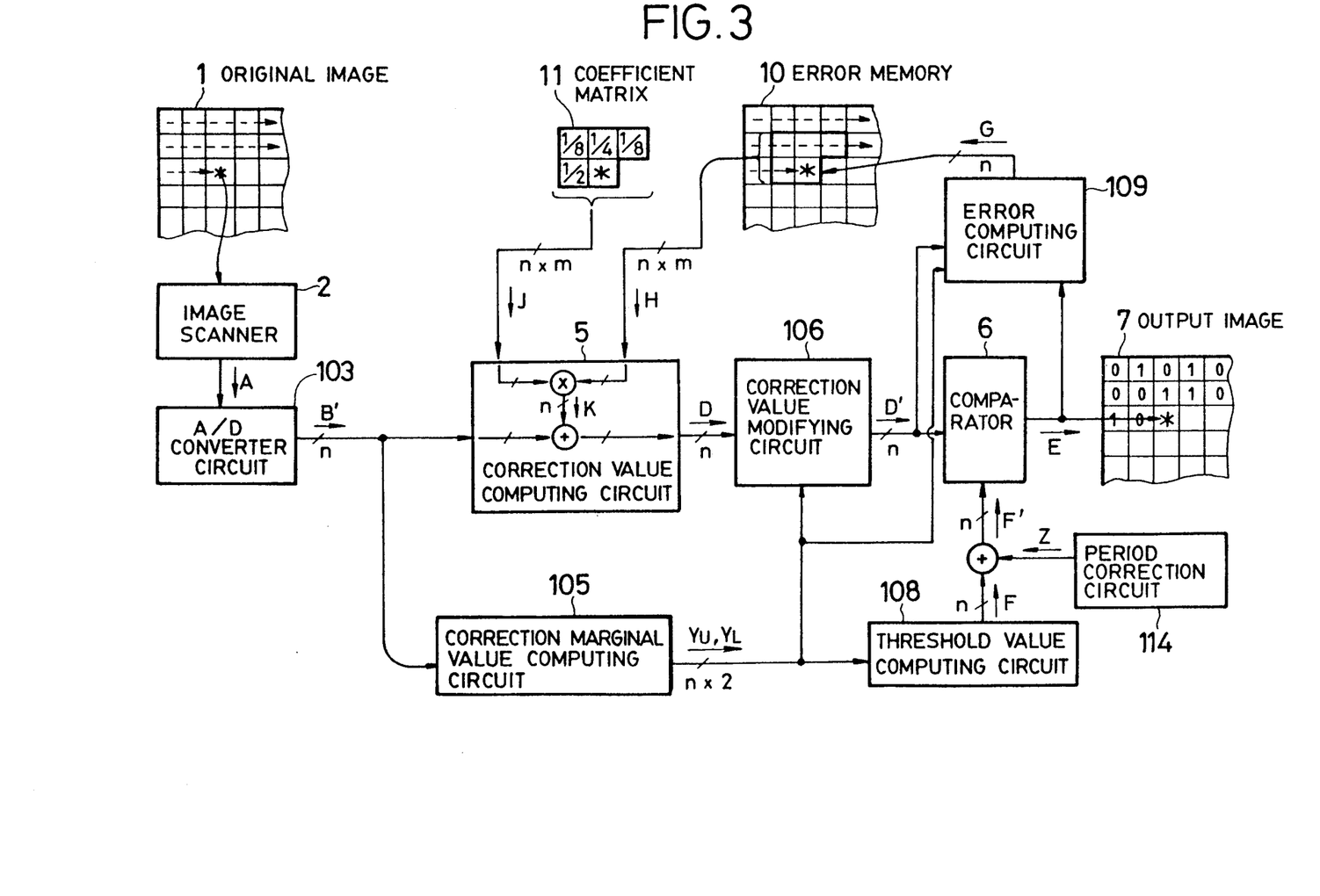
FIG. 3 is a block diagram of still another bi-level halftone processing circuit embodying the present invention.

The conventional texture circuit is not allowed to be provided according to the present invention because the density converter circuit 4 has been deleted. FIG. 3 illustrates an embodiment in which texture is prevented from occurring and the scheme of suppressing the texture is implemented by adding periodic correction to the threshold output of the threshold computing circuit 108.

A period correction circuit 114, which is provided for the purpose, generates a correction value with respect to a threshold value infinitesimally fluctuating with a short period, so that the threshold value is corrected when the correction value is added to the threshold value. As a result, this value as the threshold value thus corrected is supplied to the comparator 6.

As a correction value Z is what should range from 1 to 2 bits or thereabout, the period correction circuit 114 may be a simple one formed with one flip-flop which keeps an on/off state whenever the intended pixel is switched to another.

The threshold value fluctuated infinitesimally by means of the period correction value together with the action of dynamically computing the threshold value has the effect of suppressing the texture. Any large-scale texture suppression circuit that has heretofore been in use can be removed thereby, which contributes to reducing the size of the whole circuit.

Figure 4:
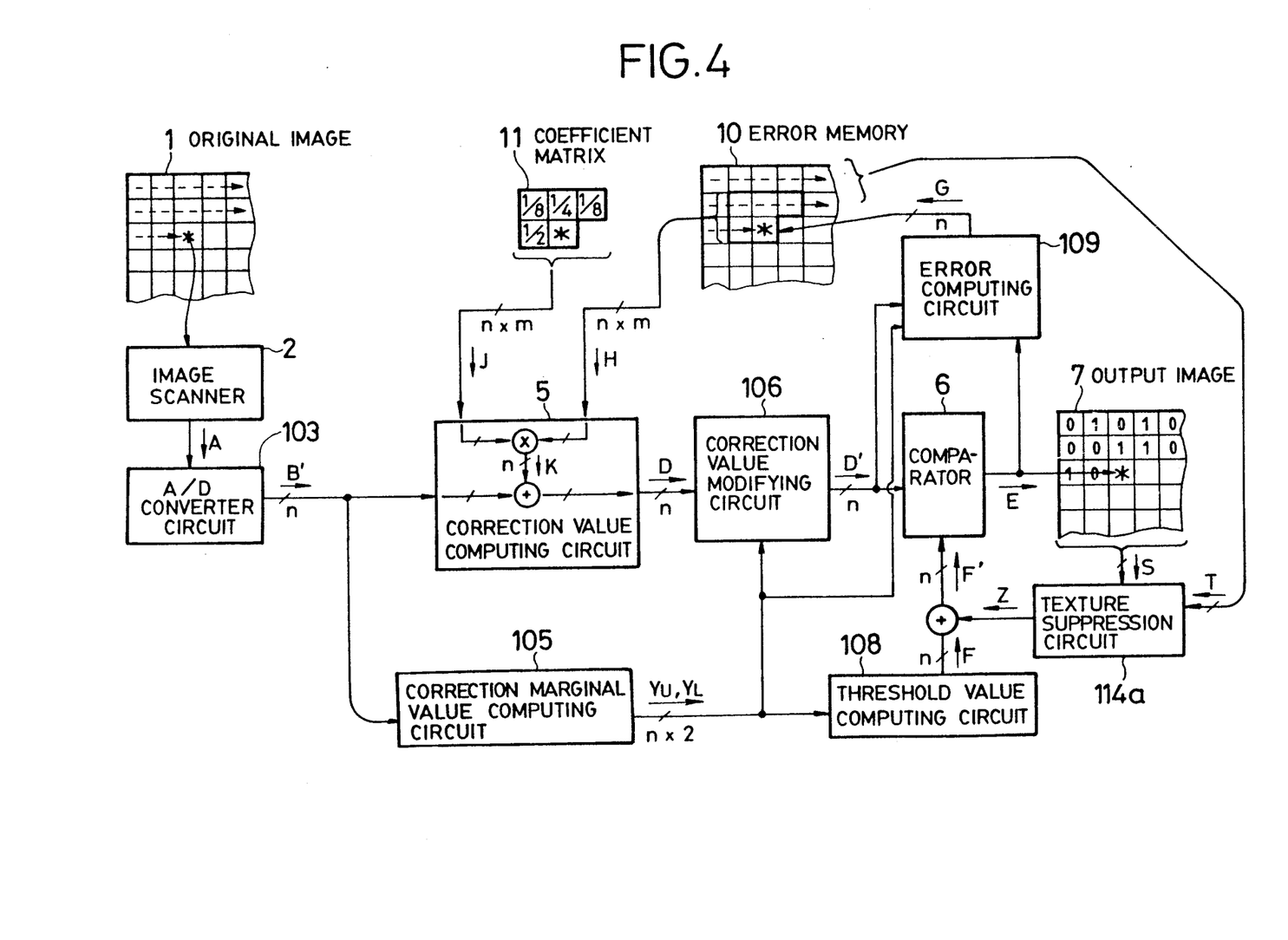
FIG. 4 is a block diagram of a further bi-level halftone processing circuit embodying the present invention.

FIG. 4 illustrates an embodiment in which a texture suppression circuit 114a instead of the period correction circuit 114 for suppressing the texture is provided.

This texture suppression circuit 114a operates to extract a peripheral pattern surrounding the object pixel out of what has stored in the error memory 10, particularly what has already been converted into a binary value, forecasts the occurrence of such a texture from the peripheral pattern, and outputs the correction quantity of the threshold value for preventing the occurrence thereof. In this regard, the texture suppression circuit 114a differs from the period correction circuit 114. The correction quantity of the threshold value varies with the pattern in the error memory 10. The threshold value in the threshold computing circuit 108 is thereby corrected. The value thus corrected is supplied to the comparator 6 as the threshold value thus corrected.

As the occurrence of such a texture can be forecasted logically from the state of the pattern in the error memory 10, it is possible to decide whether or not the pattern extracted from the error memory conforms to a particular form. Consequently, the aforementioned forecast can be made by comparing the pattern thus extracted with what is in a particular form and the correction may be made in accordance with the result obtained in this way.

As a threshold value correction quantity Z is what should range from 1 to 2 bits or thereabout in also the texture suppression circuit 114a and besides it should only range from several to about several tens of bits, the texture suppression circuit 114a may be a simple one formed with only ROM, for instance.

If the period correction circuit 114 and the texture suppression circuit 114a are caused to have the function of regulating the density level of the overall image by setting the mean value of the correction value Z of the threshold value to what is other than "0". As a result, a special regulating circuit can be dispensed with to the extent that the overall circuit size can be reduced further.

As will be understood from the embodiments above, the bit width of the A/D converter circuit which has such an analog circuit exhibiting a bad production yield and which is difficult to regulate is decreased by one bit from (n+1) to n, so that when it is integrated, consistence in view of circuitry arrangement can be attained by maintaining the bit width n of the digital circuit readily producible.

More specifically further, 64 sets of comparators with high precision resistance not exceeding one percent of error can also be dispensed with if the A/D converter circuit is set as what is of a parallel comparison type on the assumption that n designates 6 as usual as one-bit precision is degraded. As far as the sequential comparative type is concerned, it is only necessary to convert the density analog value with the accuracy reduced by half slowly, that is, at a halved speed. Consequently the circuit involved can readily be designed and this is advantageous as the production yield rate increases in view of cost reduction. Moreover, FAX and the coping machines according to the present invention are equipped with the bi-level halftone processing circuit thus arranged and offers the same halftone effect.

Although the correction marginal value computing circuit 105 has been so arranged as to output the upper and lower limit values with the memory as the central figure, it may be made to compute the upper and lower limit values by making use of a particular function or a function generator, or processing a program. Moreover, the correction value modifying circuit 106 may operate to compress the correction value D so as to make it not exceed the upper and lower limit values but remain to range therebetween.

What is claimed is:

1. A bi-level halftone processing circuit comprising an A/D converter circuit for converting the value of an analog signal of indicating a density of an image to a digital value and an error memory for storing a binary error, wherein said digital value is corrected with the value obtained by multiplying the binary error already computed and stored in said error memory by a predetermined coefficient and wherein the value thus corrected is compared with a threshold value and output in the form of a binary value, said bi-level halftone processing circuit further comprising:

a correction marginal value generating circuit for generating an upper limit value and a lower limit value which said correction value may take in conformity with said digital value, said correction value being obtainable in conformity with the density value resulting from converting the density value of an object pixel of an original image in accordance with either an exponential function or the approximate function of it, a threshold value generating circuit for dynamically generating said threshold value in accordance with said upper and lower limit values, and a correction value modifying circuit for modifying said correction value to what ranges between said upper and lower limit values, an output circuit for outputting the binary value obtained by comparing said modified value with said threshold value and for outputting, in accordance with this binary value, one of the differences between said modified value and said upper limit value and between said modified value and said lower limit value for storing in said error memory as said binary error.

2. A bi-level halftone processing circuit as claimed in claim 1, wherein said output circuit comprises a comparator which compares said modified value with said threshold value and outputs the result of comparison, and a circuit which generates the difference between said modified value and said upper limit value and the difference between said modified value and said lower limit value and supplies one of the differences to said error memory in conformity with the output of said comparator.

3. A bi-level halftone processing circuit as claimed in claim 2, wherein said correction marginal value generating circuit has a memory to be accessed in accordance with said digital value and used for outputting said upper limit value and said lower limit value, wherein said upper limit value and said lower limit value to be selected are those in accordance with $\tau$ correction characteristics, wherein said correction value modifying circuit outputs said upper limit value when said correction value exceeds said upper limit value, outputs said lower limit value when said correction value exceeds said lower limit value, and outputs said correction value directly when said correction value ranges between said upper and lower limit values.

4. A bi-level halftone processing circuit as claimed in claim 3, further comprising a value memory for storing a coefficient matrix for correcting said digital value and a correction value computing circuit which outputs said correction value by correcting said correction value on the basis of said coefficient matrix stored in said value memory, said binary error computed and stored in said error memory, and a predetermined coefficient.

5. A bi-level halftone processing circuit as claimed in claim 1, further comprising a local mean density computing circuit which generates, on receiving said digital value from said A/D converter circuit, a local mean density value as a digital value from said digital value already obtained on the peripheral pixels with respect to the pixel having said digital value, wherein said correction marginal value generating circuit generates upper and lower limit values which said correction value may take on the basis of said local mean density value in place of said digital value from said A/D converter circuit.

6. A bi-level halftone processing circuit as claimed in claim 5, wherein said correction marginal value generating circuit has a memory to be accessed in accordance with said local mean density value and used for outputting said upper limit value and said lower limit value, wherein said upper limit value and said lower limit value to be selected are those in accordance with $\tau$ correction characteristics, wherein said correction value modifying circuit outputs said upper limit value when said correction value exceeds said upper limit value, outputs said lower limit value when said correction value exceeds said lower limit value, and outputs said correction value directly when said correction value ranges between said upper and lower limit values.

7. A bi-level halftone processing circuit as claimed in claim 1, further comprising a period correction circuit which generates a correction value with respect to said threshold value periodically fluctuating, whereby said threshold value is corrected by the output of said period correction circuit.

8. A bi-level halftone processing circuit as claimed in claim 1, further comprising a texture suppression circuit for outputs a correction value with respect to said threshold value in accordance with the pattern stored in said error memory, whereby said threshold value is corrected by the output of said texture suppression circuit.

9. A bi-level halftone processing circuit comprising an A/D converter circuit for converting the value of an analog signal of indicating a density of an image to a digital value, an error memory for storing a binary error, and a correction value computing circuit for correcting said digital value with the value obtained by multiplying the binary error already computed and stored in said error memory by a predetermined coefficient and wherein the value thus corrected by said correction value computing circuit is compared with a threshold value and output in the form of a binary value, said bi-level halftone processing circuit further comprising:
a correction marginal value generating circuit which generates an upper limit value and a lower limit value which said correction value may take in conformity with said digital value, said correction value being obtainable in conformity with the density value substantially resulting from converting the density value of an object pixel of an original image in accordance with either an exponential function or the approximate function of it,
a correction value modifying circuit which modifies the correction value computed in said correction value computing circuit by using said upper and lower limit values to what ranges therebetween, and
a comparator which computes said threshold value from said upper and lower limit values, and compares said threshold value with the value modified by said modifying circuit to output a binary value,
an output circuit which outputs one of the differences between said upper limit value and said modified value and between said lower limit value and said modified value for storing in said binary error memory in conformity with said binary value.

10. A bi-level halftone processing circuit comprising:
an A/D converter circuit for converting the value of an analog signal of indicating a density of an image to a digital value,
an error memory for storing a binary error,
a correction value computing circuit which computes a correction value with said digital value by correcting said digital value with the value obtained by multiplying the binary error already computed and stored in said error memory by a predetermined coefficient,
a correction marginal value generating circuit which generates an upper limit value and a lower limit value which said correction value may take in conformity with said digital value, said correction value being obtainable in conformity with the density value substantially resulting from converting the density value of an object pixel of an original image in terms of either an exponential function or an approximate function
a threshold value generating circuit which dynamically generates said threshold value in accordance with said upper and lower limit values,
a correction value modifying circuit which modifies said correction value to what ranges between said upper and lower limit values,
a comparator which outputs a binary value obtainable by comparing said modified value with said threshold value, and
an error computing circuit which outputs, in conformity with said binary value, one of the differences between said modified value and said upper limit value and between said modified value and said lower limit value to said error memory as said binary error.

11. An image processing apparatus comprising an A/D converter circuit for converting the value of an analog signal of indicating a density of an image to a digital value, an error memory for storing a binary error, and a correction value computing circuit for correcting said digital value with the value obtained by multiplying the binary error already computed and stored in said error memory by a predetermined coefficient and wherein the value thus corrected by said correction value computing circuit is compared with a threshold value and output in the form of a binary value, said image processing apparatus further comprising:
a correction marginal value generating circuit which generates an upper limit value and a lower limit value which said correction value may take in conformity with said digital value, said correction value being obtainable in conformity with the density value substantially resulting from converting the density value of an object pixel of an original image in terms of either an exponential function or the approximate function of it,
correction value modifying circuit which modifies the correction value computed in said correction value computing circuit by using said upper and lower limit values to what ranges therebetween, and a comparator for computing said threshold value from said upper and lower limit values, and comparing said threshold value with the value modified by said modifying circuit to output a binary value, an output circuit which outputs one of the differences between said upper limit value and said modified value and between said lower limit value and said modified value for storing in said binary error memory in conformity with said binary value, whereby a bi-level halftone signal is generated.

* * * * *